(12) United States Patent
Bhalerao et al.

(10) Patent No.: US 10,298,652 B2
(45) Date of Patent: May 21, 2019

(54) CONTROL FOR CONTENT CHANNEL IN WEB REAL-TIME COMMUNICATION

(71) Applicant: Avaya Inc., Santa Clara, CA (US)

(72) Inventors: Jaydeep Deepak Bhalerao, Pune (IN); Biswajyoti Pal, Navi Mumbai (IN); Manish Chatterjee, Calcutta (IN)

(73) Assignee: Avaya Inc., Santa Clara, CA (US)

( * ) Notice: Subject to any disclaimer, the term of this patent is extended or adjusted under 35 U.S.C. 154(b) by 654 days.

(21) Appl. No.: 14/561,000

(22) Filed: Dec. 4, 2014

(65) Prior Publication Data

US 2016/0164929 A1    Jun. 9, 2016

(51) Int. Cl.
*H04L 29/06* (2006.01)
*H04L 29/08* (2006.01)

(52) U.S. Cl.
CPC ........ *H04L 65/608* (2013.01); *H04L 65/4038* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 2004/0179036 | A1* | 9/2004 | Teplov | G06F 3/1454 715/751 |
| 2010/0111101 | A1* | 5/2010 | McKee | H04N 21/441 370/466 |
| 2010/0299401 | A1* | 11/2010 | Lloyd | G06F 15/16 709/209 |
| 2011/0289108 | A1* | 11/2011 | Bhandari | G06F 17/30905 707/769 |
| 2013/0209070 | A1* | 8/2013 | Rivas-Micoud | H04N 5/44591 386/285 |
| 2014/0292999 | A1* | 10/2014 | Do | H04L 65/608 348/14.07 |
| 2014/0379931 | A1* | 12/2014 | Gaviria | H04L 65/1016 709/227 |
| 2016/0149986 | A1* | 5/2016 | Ding | H04L 67/02 709/217 |
| 2017/0048286 | A1* | 2/2017 | Ichihashi | G06F 13/00 |

OTHER PUBLICATIONS

'Meetecho @ IETF87 Web Client', Meetecho.com, Apr. 9, 2014 [retrieved on Apr. 18, 2017]. Retrieved from the Internet: <URL:http://ietf87.conf.meetecho.com/index.php/Web_Client>.*

(Continued)

*Primary Examiner* — Sm A Rahman
*Assistant Examiner* — Dae Kim
(74) *Attorney, Agent, or Firm* — Sheridan Ross P.C.

(57) ABSTRACT

In order to provide compatibility between WebRTC communication endpoints and legacy communication endpoints that use BFCP, a web media gateways is used to establish a conference call between the communication endpoints that use WebRTC and the legacy communication endpoints that use BFCP. A floor command is received to control the floor of the conference call from a first communication endpoint. The floor command is translated from WebRTC into BFCP or from BFCP to WebRTC. The floor command is sent to the second communication endpoint. This allows a conference call where communication endpoints support both WebRTC and BFCP.

20 Claims, 4 Drawing Sheets

(56) References Cited

OTHER PUBLICATIONS

'Floor control mechanism for Web Real-Time Communication (WebRTC) based conferences', Research Disclosure, Aug. 2012 [retrieved on Apr. 18, 2017]. Research Disclosure database No. 580023. Retrieved from the Internet: <URL:https://rd.orbit.com/rd/search/RD580023.pdf>.*

Pascual, V. "The IMS approach to WebRTC", WebRTCh4cks, Mar. 30, 2014 [retrieved on Jun. 19, 2018]. Retrieved from the Internet: <https://webrtchacks.com/ims-approach-webrtc/>.*

"VCS to CUCM Hold problem discussion", Cisco Support Community Forums, Jun. 16, 2014 [retrieved on Jun. 16, 2014]. Retrieved from the Internet: <https://supportforums.cisco.com/t5/unified-communications/vcs-to-cucm-hold-probem/td-p/2503595>.*

"Best Practices for Role-Based Video Streams (RBVS) in SIP". IMTC SIP Parity Group, Version 33, Jul. 13, 2011 [retrieved on Jun. 19, 2018]. Retrieved from the Internet: <https://www.ietf.org/lib/dt/documents/LIAISON/liaison-2012-05-31-imtc-the-ietf-imtc-work-on-sip-feature-parity-with-h323-attachment-3.pdf>.*

Dahle, H. "The Pexip Infinity Distributed Gateway Feature Whitepaper", Pexip website, Apr. 3, 2014 [retrieved on Feb. 13, 2017]. Retrieved from the Internet: <https://www.pexip.com/article/whitepaper/pexip-infinity-distributed-gateway-feature>.*

\* cited by examiner

CONTROL FOR CONTENT CHANNEL IN WEB REAL-TIME COMMUNICATION

TECHNICAL FIELD

The systems and methods disclosed herein relate to conferencing systems and in particular to conferencing systems using different protocols.

BACKGROUND

Legacy Session Initiation Protocol (SIP) conferencing systems use protocols like Binary Floor Control Protocol (BFCP) to control of the floor between multiple parties in a conference distributed across one or more conference bridges. Floor control is a process to manage joint or exclusive access to shared resources in a conferencing environment. For example, BFCP can control who has the right to send media in a conference.

Web Real-Time Communication (WebRTC) clients have similar functionality that is provided over proprietary mechanisms that use Hyper Text Transfer Protocol (HTTP). WebRTC provides enhanced capabilities that are beyond what is currently supported by BFCP. Because of these incompatibilities, BFCP and WebRTC are currently provided as separate solutions for controlling the floor of a conference call.

SUMMARY

Systems and methods are provided to solve these and other problems and disadvantages of the prior art. In order to provide compatibility between WebRTC communication endpoints and legacy communication endpoints that use BFCP, a web media gateways is used to establish a conference call between the communication endpoints that use WebRTC and the legacy communication endpoints that use BFCP. A floor command is received to control the floor of the conference call from a first communication endpoint. The floor command is translated from WebRTC into BFCP or from BFCP to WebRTC. The floor command is sent to the second communication endpoint. This allows a conference call where communication endpoints support both WebRTC and BFCP.

DETAILED DESCRIPTION

Figure 1:
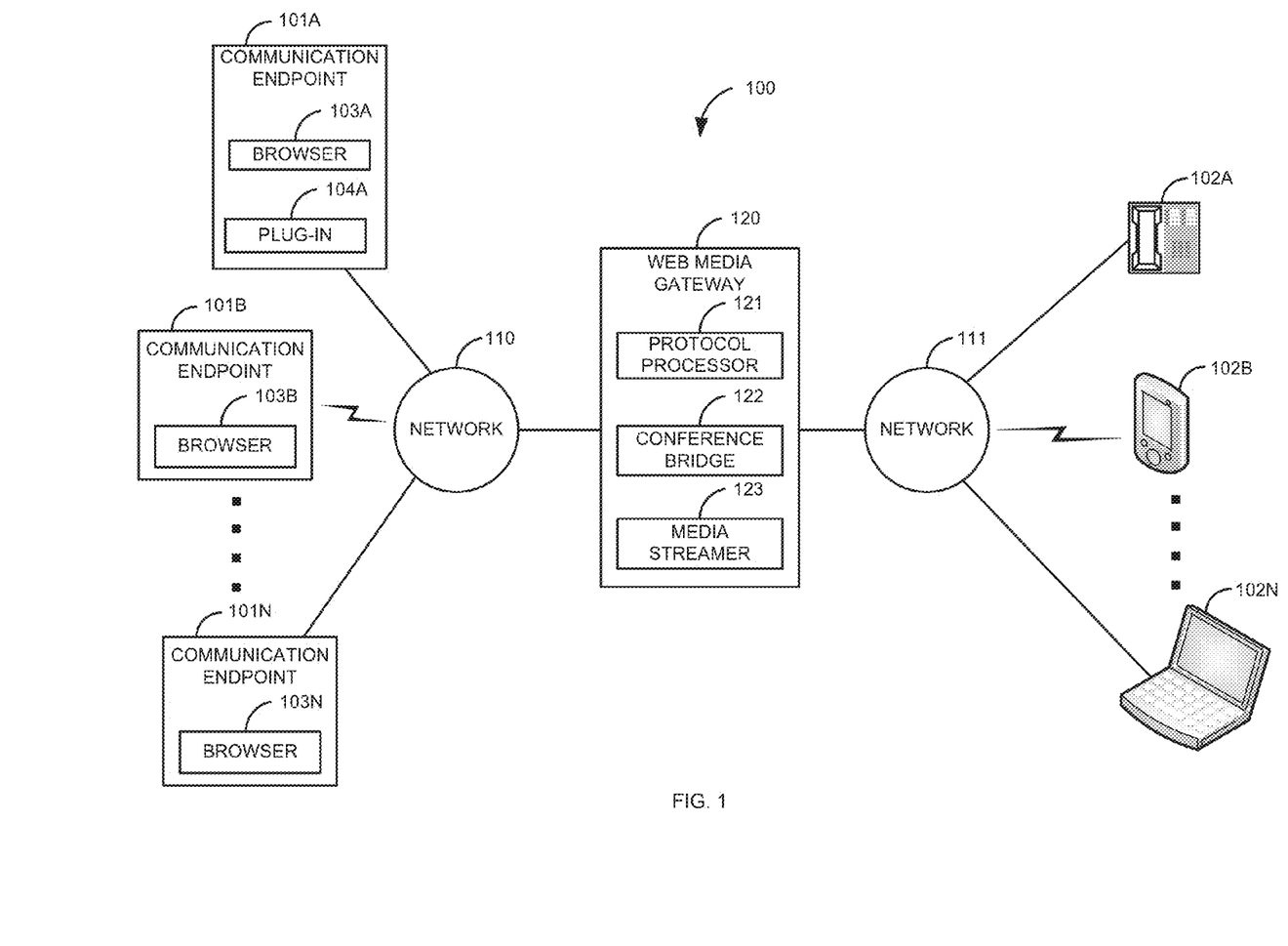
FIG. 1 is a block diagram of a first illustrative system for controlling a conference call.

FIG. 1 is a block diagram of a first illustrative system 100 for controlling a conference call. The first illustrative system 100 comprises communication endpoints 101A-101N, legacy communication endpoints 102A-102N, networks 110-111, and a web media gateway 120.

The communication endpoints 101A-101N can be or may include any communication endpoint that can communicate on the network 110, such as a Personal Computer (PC), a telephone, a video system, a cellular telephone, a Personal Digital Assistant (PDA), a tablet device, a notebook device, a smart phone, and/or the like. As shown in FIG. 1, any number of communication endpoints 101A-101N may be connected to the network 110, including only a single communication endpoint 101. In addition, the communication endpoint 101 may be directly connected (hardwired) to the web media gateway 120.

The communication endpoints 101A-101N further comprises browsers 103A-103N. The browsers 103A-103N can be or may include any software that can browse the network 110, such as Firefox®, Internet Explorer®, Google Chrome®, Opera®, Safari®, and/or the like. The browser 101 may communicate on the network 110 using protocols, such as HTTP and WebRTC.

The communication endpoint 101A further comprises a browser plug-in 104A. The browser plug-in 104A can be any browser plug-in that can provide additional features to the browser 103. Although the communication endpoints 101B-101N do not show the browser plug-in 104, these communication endpoints 101B-101N may also have the browser plug-in 104.

The legacy communication endpoints 102A-102N can be or may include any communication endpoint that can communicate on the network 111, such as a Personal Computer (PC), a telephone, a video system, a cellular telephone, a Personal Digital Assistant (PDA), a tablet device, a notebook device, a smart phone, and/or the like. As shown in FIG. 1, any number of legacy communication endpoints 102A-102N may be connected to the network 111, including only a single legacy communication endpoint 102. In addition, the legacy communication endpoint 102 may be directly connected (hardwired) to the web media gateway 120. The legacy communication endpoints 102A-102N use legacy protocols, such as SIP and BFCP while the communication endpoints 101A-101N use protocols such as HTTP, WebRTC, and JavaScript Object Notation Remote Procedure Call (JSON-RPC).

The networks 110 and 111 can be or may include any collection of communication equipment that can send and receive electronic information, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), HTTP, WebRTC, JSON-RPC, and the like. In one embodiment, the network 110 may be the Internet and the network 111 may be a corporate or private network that uses legacy protocols such as SIP. In another embodiment, the networks 110 and 111 are the same network.

The web media gateway 120 can be or may include any hardware/software that can manage protocol conversion between the network 110 and the network 111 (or between communication endpoints 101/102 on the same network), such as a network switch, a Private Branch Exchange, a Multi-point Control Unit (MCU), a switch, a router, a central office switch, and/or the like.

The web media gateway 120 further comprises a protocol processor 121, a conference bridge 122, and a media streamer 123. The protocol processor 121 can be or may include any hardware/software that can process protocols, such as, WebRTC, JSON-RPC, SIP, BFCP, and/or the like.

The conference bridge 122 can be or may include any hardware/software that can bridge a conference call, such as a MCU, an audio bridge, a video bridge, a multimedia bridge, and/or the like. A conference call can be an audio conference call, a video conference call, a multimedia conference call, and/or the like. The conference bridge 122 can bridge any of the above types of conference calls between the communication endpoints 101A-101N and the legacy communication endpoints 102A-102N.

The media streamer 123 can be or may include any hardware/software that can be used to stream media in a conference call. The media streamer 123 can be controlled by a specific participant in the conference call. The media streamer 123 can be used to determine who can receive the media stream.

In another embodiment, elements (121-123) of the web media gateway 120 can be included in the networks 110 and/or 111. For example, the media streamer 123 may be on a server in the network 110 or 111. Alternatively, the protocol processor 121 and the conference bridge 122 may be wholly in one or more of the communication endpoints 101A-101N and/or the legacy communication endpoints 102A-102N. In other embodiments, the elements 121-123 of the media gateway 120 may be distributed between the media gateway 120 and the communication endpoints 101A-101N and/or the legacy communication endpoints 102A-102N.

Figure 2:
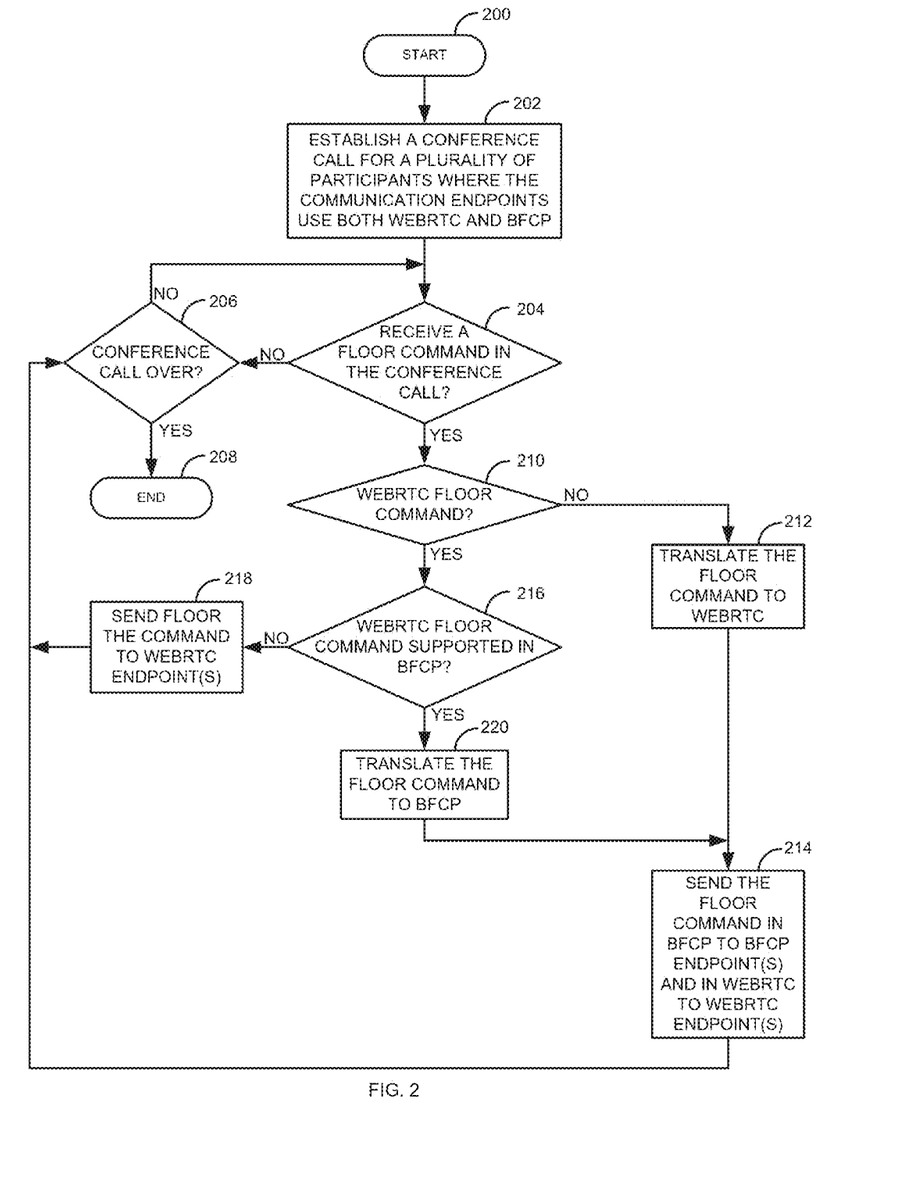
FIG. 2 is a flow diagram of a process for controlling a conference call.
Figure 3:
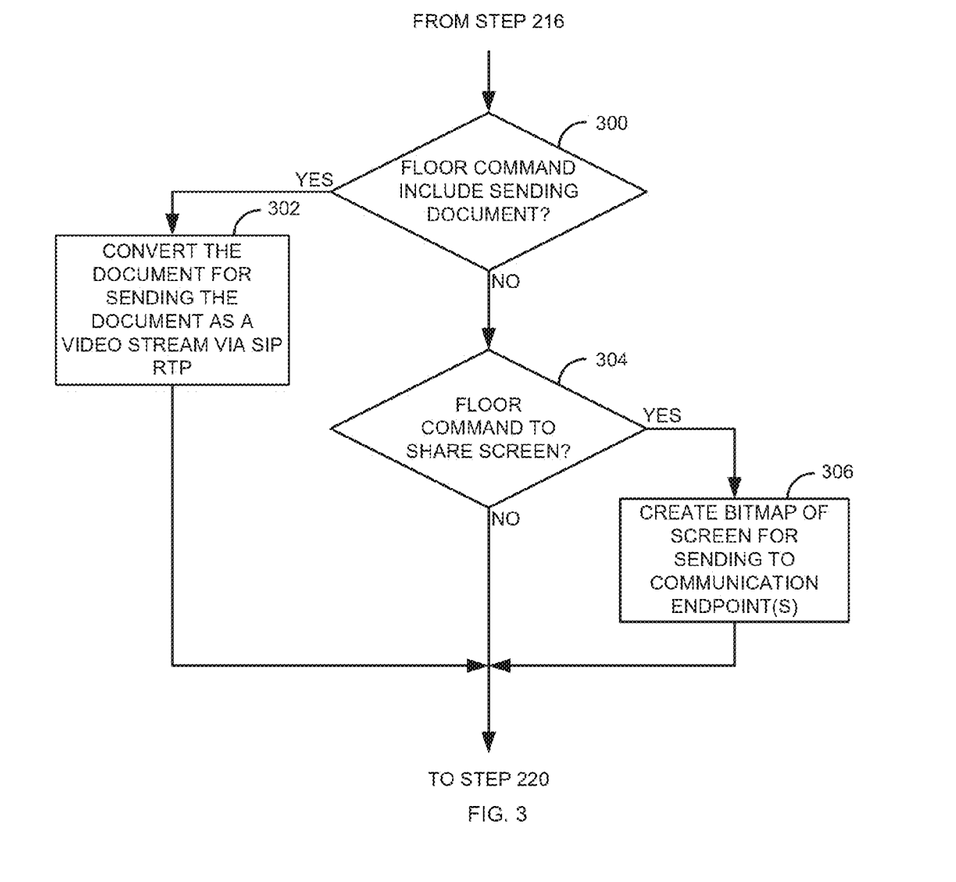
FIG. 3 is a flow diagram of a process for sharing documents and sharing a screen during a conference call.
Figure 4:
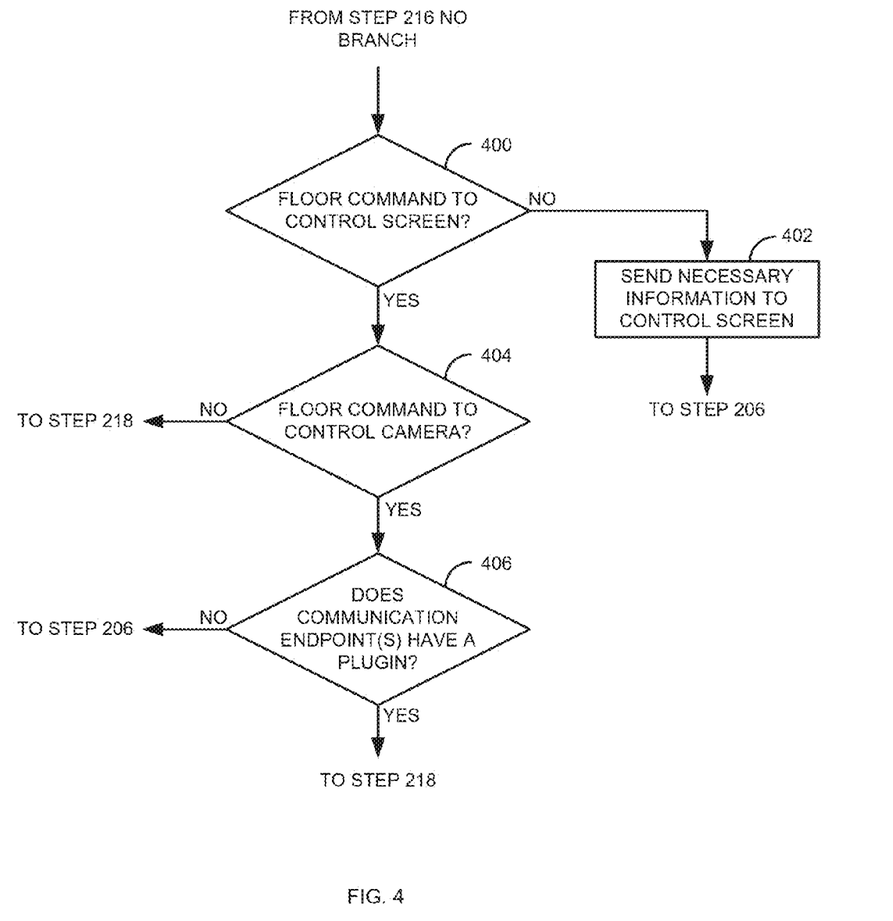
FIG. 4 is a flow diagram of a process for managing floor commands.

FIG. 2 is a flow diagram of a process for controlling a conference call. Illustratively, the communication endpoints 101A-101N, the legacy communication endpoints 102A-102N, the browsers 103A-103N, the plug-in 104A, the web media gateway 120, the protocol processor 121, the conference bridge 122, and the media streamer 123 are stored-program-controlled entities, such as a computer or processor, which performs the method of FIGS. 2-4 and the processes described herein by executing program instructions stored in a non-transient computer readable storage medium, such as a memory or disk. Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The process starts in step 200. A conference call is established by the conference bridge 122 for a plurality of participants in step 202. The conference call can be an audio conference call, a video conference call, a multimedia conference call, and/or the like. The conference call includes at least one of the communication endpoints 101A-101N (using WebRTC) and at least one of the legacy communication endpoints 102A-102N (using BFCP). For illustrative purposes, the following discussion will assume that all of the communication endpoints 101A-101N and the legacy communication endpoints 102A-102N are in the conference call. The conference call can be established in various ways, such as initiated by one of the communication endpoints 101A-101N, initiated by one of the legacy communication endpoints 102A-102N, initiated by the conference bridge 122, and/or the like.

The conference bridge 122 waits to receive a floor command to control the floor of the conference call in step 204. Control of the floor is the ability to control or manage joint or exclusive access to shared resources within the conference call. The types of resources can include resources associated with conference and media session setup, conference policy manipulation, and media control. For example, a participant who has been granted the floor of the conference call may control the media streamer 123 for the conference call. Alternatively, the participant who controls the floor of the conference call may control which participants may speak or view specific materials in the conference call. Floor control can include controlling a recording device that records the conference call. Floor commands can include any of the floor commands supported by the BFCP protocol as defined in IETF Trust RFC 4582 (Nov. 2006), which is incorporated herein in its entirety by reference. The floor command to control the floor of the conference call may be a command that is not supported under BFCP.

If a floor command is not received in step 204, the conference bridge 122 determines in step 206 if the conference call is over. If the conference call is over in step 206, the process ends in step 208. Otherwise, if the conference call is not over in step 206, the process goes back to step 204.

If a floor command is received in step 204, the conference bridge 122 determines in step 210 if the floor command is a WebRTC floor command from one of the communication endpoints 101A-101N. For example, the WebRTC floor command may be sent using WebRTC and JavaScript Object Notation Remote Procedure Call (JSON-RPC). If the floor command is not a WebRTC floor command in step 210, but is instead a BFCP floor command from one of the legacy communication endpoints (e.g., legacy communication endpoint 102A), the protocol processor 121 translates the BFCP floor command to a WebRTC floor command in step 212. The protocol processor 121 sends the floor command in BFCP to the legacy communication endpoints 102B-102N and sends the floor command in WebRTC to the communication endpoints 101A-101N in step 214. After the floor commands(s) have been sent in step 214, the process goes back to step 206 to determine if the conference call is over.

In some embodiments, the floor command may only be directed to a specific communication endpoint 101 (e.g., communication endpoint 101A). In this case, only a single WebRTC floor command will be sent in step 214 to the communication endpoint 101A. Likewise, only a specific group of communication endpoints (101 and/or 102) may be the target of the floor command. In this case, only the group of communication endpoints (101 and/or 102) may be sent the floor command in step 214.

If the floor command is a WebRTC floor command in step 210, the conference bridge 122 determines in step 216 if the WebRTC floor command is supported in BFCP. WebRTC supports additional floor commands that are not supported by BFCP. For example, BFCP does not allow a legacy communication endpoint 102 to control another legacy communication endpoint 102 using BFCP. However, this type of functionality can be supported under WebRTC. By allowing for new functionality via WebRTC communication endpoints 101, support for existing BFCP devices can also be supported within the same conference call.

If the floor command is not supported in BFCP in step 216, the protocol processor 121 sends the floor command to the communication endpoints 101A-101N. If the target is a single or group of communication endpoints 101 in step 218, then only the specific communication endpoints 101 that are the target of the floor command will be sent the floor command in WebRTC in step 218. The process then goes to step 206.

In one embodiment, if the target is a single legacy communication endpoint 102, then no floor command will be sent in step 218. In addition, an error will be generated and sent to communication endpoint 101 that sent the floor command received in step 204. Likewise, if the target is a group that contains one or more legacy communication endpoints 102, an error will be generated for the specific legacy communication endpoints 102 and sent to the communication endpoint 101 that sent the floor command in step 204.

If the WebRTC floor command is supported in BFCP in step 216, the protocol processor 121 translates the WebRTC floor command into BFCP in step 220 and the process goes to step 214. As discussed previously, in step 214, the process will send the floor command to the target communication endpoints (101 and/or 102). The process then goes to step 206.

For example, consider the following example. Once the conference call has been established between the communication endpoints 101A-101N and the legacy communication endpoints 102A-102N, a presenter of the conference call, using the communication endpoint 101A, send a floor command to control the media streamer 123 using WebRTC and JSON-RPC. The conference bridge 124 receives the floor command to control the media streamer 123. The protocol processor 121 translates the floor command to BFCP. The translated floor command in BFCP that the communication endpoint 101A controls the media streamer 123 is sent to the legacy communication endpoints 102A-102N via SIP. Likewise, a WebRTC floor command is sent to the communication endpoints 101B-101N indicating that the communication endpoint 101A controls the media streamer 123. The presenter can then use the media streamer 123 to send a video during the conference call.

At this point, the communication endpoints 101B-101N and the legacy communication endpoints 102A-102N will not be able to control the media streamer 123 until the communication endpoint 101A releases the media streamer 123. When the communication endpoint 101A releases the media streamer 123 (via a floor command), a second presenter at the legacy communication endpoint 102A can initiate the sending of a floor command to control the media streamer 123. In this case, the protocol processor 121 translates the BFCP floor command to WebRTC. The translated BFCP floor command is sent to the communication endpoints 101A-101N using JSON-RPC. Likewise, the BFCP floor command is sent to the legacy communication endpoints 102B-102N using SIP.

FIG. 3 is a flow diagram of a process for sharing documents and sharing a screen during a conference call. The process of FIG. 3 goes between step 216 and step 220 of FIG. 2. After determining that the WebRTC floor command is supported in BFCP in step 216, the protocol processor 121 determines in step 300 if the floor command includes sending a document. A document can include various kinds of documents, such as a text document, a slide presentation, a PDF, a spread sheet, and/or the like. For example, the floor command can include text document will be presented during the conference call. If the protocol processor 121 determines that the floor command includes a document in step 300, the media streamer 123 converts the document so that the document can be sent as a video stream using SIP Real-time Transport Protocol (RTP) for the legacy communication endpoints 102 in step 302. The process goes to step 220 where the command is translated and sent along with the video stream of the document.

If the document in step 220 is a slide presentation or other document that is being presented via a communication the communication endpoint 101A, the document is shared with the other communication endpoints 101B-101N. In addition, application specific metadata can be shared by the communication endpoint 101A via WebRTC/JSON-RPC to the web media gateway 120. The web media gateway 120 can relay the application specific metadata to the other communication endpoints 101B-101N (via WebRTC) to identify a specific slide in the slide presentation to be displayed needs to be displayed by the communication endpoints 101B-101N.

For legacy communication endpoints 102, the web media gateway can keep snapshots (i.e., for each slide in the slide presentation). Upon receiving the metadata corresponding to the specific slide, the web media gateway 120 can change the video stream to display the slide currently being displayed. In this embodiment, the web media gateway acts like a WebRTC client that takes the metadata and uses the metadata to change the video in the video stream that is sent to the legacy communication endpoints 102A-102N.

Otherwise, if the floor command is not for sending a document in step 300, the protocol processor 121 determines in step 304 if the floor command is to share the screen of the communication endpoint 101. If the floor command is to share the screen of the communication endpoint 101 in step 304, the media streamer 123 creates a bitmap of the screen of the communication endpoint 101 for sending to the communication endpoints 101 and legacy communication endpoints 102. The process goes to step 220 where the command is translated and sent along with the bitmap. Otherwise, if the floor command is not to share a screen, the process goes to step 220.

In some embodiments, two or more floor commands may be sent at the same time. For example, a floor command to share a screen may be sent with a floor command to control a screen of a communication endpoint 101. In this example, the floor command to share the screen is supported in BFCP and WebRTC while the command to control the screen is only supported in WebRTC. This will result in the ability to control another communication endpoint 101 (using WebRTC) and the results can be shared with the communication endpoints 101 (using WebRTC) and legacy communication endpoints 102 (in view mode only using BFCP).

FIG. 4 is a flow diagram of a process for managing floor commands. The process goes between steps 216, 218, and 206 of FIG. 2. After determining that the WebRTC floor command is not supported in BFCP in step 216, the protocol processor 121 determines in step 400 if the command is to control the screen of one of the communication endpoints 101. If the command is to control the screen of one of the communication endpoints 101 in step 400, the protocol processor 121 send the necessary information to control the screen of the communication endpoint 101. For example, the protocol processor 121 can send keystrokes, mouse events, and mouse position that allows a user to control the screen of a different communication endpoint 101. The process then goes to step 206 to see if the conference call is over.

Otherwise, if the floor command is not to control the screen in step 400, the protocol processor 121 determines in step 404 if the floor command is to control a camera of one of the communication endpoints 101. If the floor command is not to control a camera of one of the communication endpoints 101, the process goes to step 218.

If the floor command is to control a camera in a communication endpoint 101, the protocol processor 121 determines in step 406 if the communication endpoint(s) have a browser plug-in 104 to control the camera of the communication endpoint(s) 101. A browser plug-in 104 is necessary because this functionality is not supported in existing browsers 103. If the communication endpoint 101 does not have a browser plug-in 104, the process goes to step 206. In addition, an error message can be sent to indicate that this capability is not supported in the communication endpoint 101.

Otherwise, if the communication endpoint does have a browser plug-in 104, the process goes to step 218. The floor command to control the camera of the communication endpoint 101 is sent in step 218. The floor command also includes information on how to control the camera, such as, zooming in, zooming out, panning, changing resolution, etc. The floor command is received by the browser plug-in 104 in the communication endpoint 101. This allows the camera to be controlled remotely.

The above examples all discuss the use of the legacy protocol BFCP. However, in other embodiments, support for other protocols, such as XCON Centralized Conferencing Manipulation Protocol (XCON CCMP) can be used instead of or intermixed with BFCP.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method for managing a conference call comprising:
   determining that the conference call has been established, wherein the conference call comprises a plurality of participants, wherein at least a first communication endpoint of the conference call uses Web Real-Time Communication (WebRTC) for the conference call, and wherein at least a second communication endpoint of the conference call uses Binary Floor Control Protocol (BFCP) for the conference call;
   receiving a first floor command to control the floor of the conference call from the first communication endpoint, wherein the first floor command is in a message that comprises the floor command and a document that is displayed in the conference call;
   translating the first floor command from WebRTC into BFCP, wherein translating the first floor command from WebRTC into BFCP further comprises sending the document as a video stream via Session Initiation Protocol (SIP); and
   sending the translated first floor command to the second communication endpoint.

2. The method of claim 1, wherein the first floor command is received via JavaScript Object Notation Remote Procedure Call (JSON-RPC) and a second floor command is received via Session Initiation Protocol (SIP).

3. The method of claim 1, wherein a second floor command is a BFCP floor command.

4. The method of claim 1, wherein the conference call comprises a third communication endpoint that uses WebRTC and further comprising:
   receiving a second floor command from the first communication endpoint via WebRTC, wherein the second floor command is not supported by BFCP;
   sending the second floor command to the third communication endpoint and not sending the second floor command to the second communication endpoint.

5. The method of claim 1, wherein the document is a slide presentation and further comprising:
   sending metadata to indicate a slide in the slide presentation is being displayed; and
   changing the video stream to correspond to the slide indicated by the metadata.

6. The method of claim 1, wherein the conference call comprises a third communication endpoint that uses WebRTC, and further comprising sending a second floor command, wherein the second floor command is to share a screen of the first communication endpoint via a bitmap with the second communication endpoint and the third communication endpoint.

7. The method of claim 6, further comprising:
   the third communication endpoint taking control of the first communication endpoint and the second communication endpoint being in view only mode.

8. The method of claim 1, wherein a second floor command is converted to XCON Centralized Conferencing Manipulation Protocol (XCON CCMP).

9. The method of claim 1, wherein the first communication endpoint sends a second floor command, wherein the second floor command is a command to control a camera in a third communication endpoint that uses WebRTC and wherein the third communication endpoint has a browser plug-in to support the control of the camera in the third communication endpoint.

10. The method of claim 1, wherein the conference call comprises a third communication endpoint that uses WebRTC and further comprising:
    sending, by the first communication endpoint, a second floor command, wherein the second floor command identifies a specific group of communication endpoints that communicate using different floor control protocols, wherein the group of communication endpoints includes the second communication endpoint and the third communication endpoint.

11. The method of claim 1, wherein the conference call comprises a third communication endpoint that uses WebRTC and further comprising:
    sending a second floor command, wherein the second floor command is for the second communication endpoint and the third communication endpoint;
    determining that the second floor command is not supported under BFCP; and
    in response to determining that the second floor command is not supported under BFCP, sending an error message to the first communication endpoint indicating that the second communication endpoint does not support the second floor command.

12. The method of claim 1, wherein the video stream is a Real-Time Transport (RTP) stream.

13. The method of claim 1, wherein the conference call comprises a third communication endpoint that uses WebRTC and wherein the first floor command comprises a plurality of floor commands for the second communication endpoint and the third communication endpoint.

14. The method of claim 1, wherein the first communication endpoint sends a second floor command, wherein the second floor command is a command to control a camera in a third communication endpoint that uses WebRTC and wherein the third communication endpoint does not have a browser plug-in to support the control of the camera in the third communication endpoint and further comprising:
    receiving a message that indicates that the third communication endpoint does not support the browser plug-in.

15. A system for managing a conference call comprising:
    a memory,
    a microprocessor in communication with the memory, the microprocessor executes software modules, the software modules comprising:

a conference bridge that determines that the conference call has been established, wherein the conference call comprises a plurality of participants, wherein at least a first communication endpoint of the conference call uses Web Real-Time Communication (WebRTC) for the conference call, and wherein at least a second communication endpoint of the conference call uses Binary Floor Control Protocol (BFCP) for the conference call;

a protocol processor that (a) receives a first floor command to control the floor of the conference call from the first communication endpoint, wherein the first floor command is in a message that comprises the first floor command and a document that is displayed in the conference call, (b) translates the first floor command from WebRTC into BFCP, wherein translating the first floor command from WebRTC into BFCP further comprises sending the document as a video stream via Session Initiation Protocol (SIP), and (c) sends the translated first floor command to the second communication endpoint.

16. The system of claim 15, wherein the first floor command is received via JavaScript Object Notation Remote Procedure Call (JSON-RPC) and a second floor command is received via Session Initiation Protocol (SIP).

17. The system of claim 15, wherein the conference call comprises a third communication endpoint that uses WebRTC and wherein:

the protocol processor receives a second floor command from the first communication endpoint via WebRTC, wherein the second floor command is not supported by BFCP and sends the second floor command to the third communication endpoint and does not send the second floor command to the second communication endpoint.

18. The system of claim 15, wherein the conference call comprises a third communication endpoint that uses WebRTC, wherein the first communication endpoint sends a second floor command, wherein the second floor command is to share a screen of the first communication endpoint via a bitmap with the second communication endpoint and the third communication endpoint.

19. The system of claim 18, wherein the third communication endpoint takes control of the first communication endpoint and the second communication endpoint is in view only mode.

20. The system of claim 15, wherein the first communication endpoint sends a second floor command, wherein the second floor command is a floor command to control a camera in a third communication endpoint that uses WebRTC and wherein the third communication endpoint has a browser plug-in to support the control of the camera in the third communication endpoint.

* * * * *